2 Sheets--Sheet 1.
F. BRAMER.
Mowing-Machines.
No. 156,760.  Patented Nov. 10, 1874.
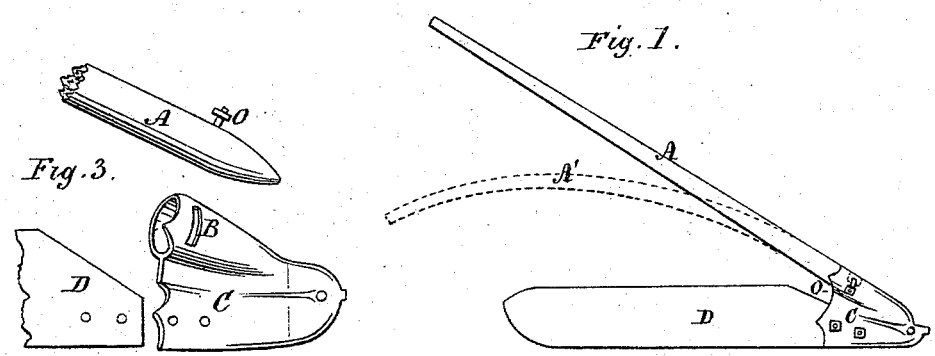
Fig. 1.
Fig. 3.
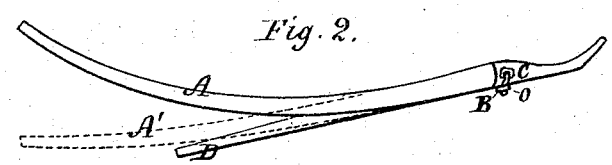
Fig. 2.
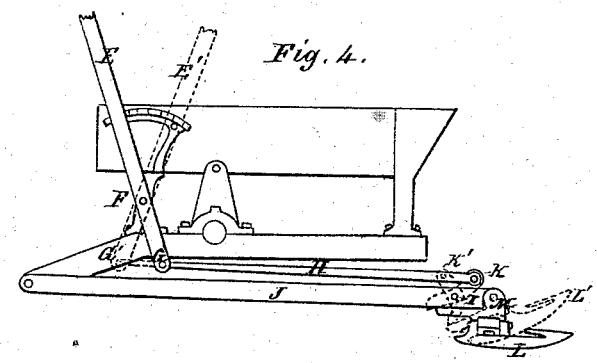
Fig. 4.
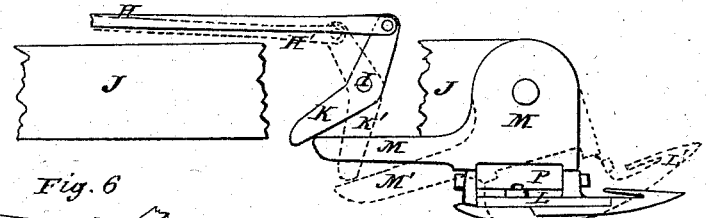
Fig. 5.
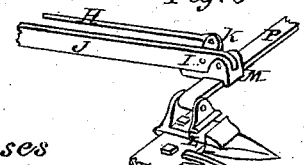
Fig. 6.
Witnesses
Alex. Mahon
J. T. Thomas
Inventor.
Frank Bramer
by A. H. Knittle
Attorney

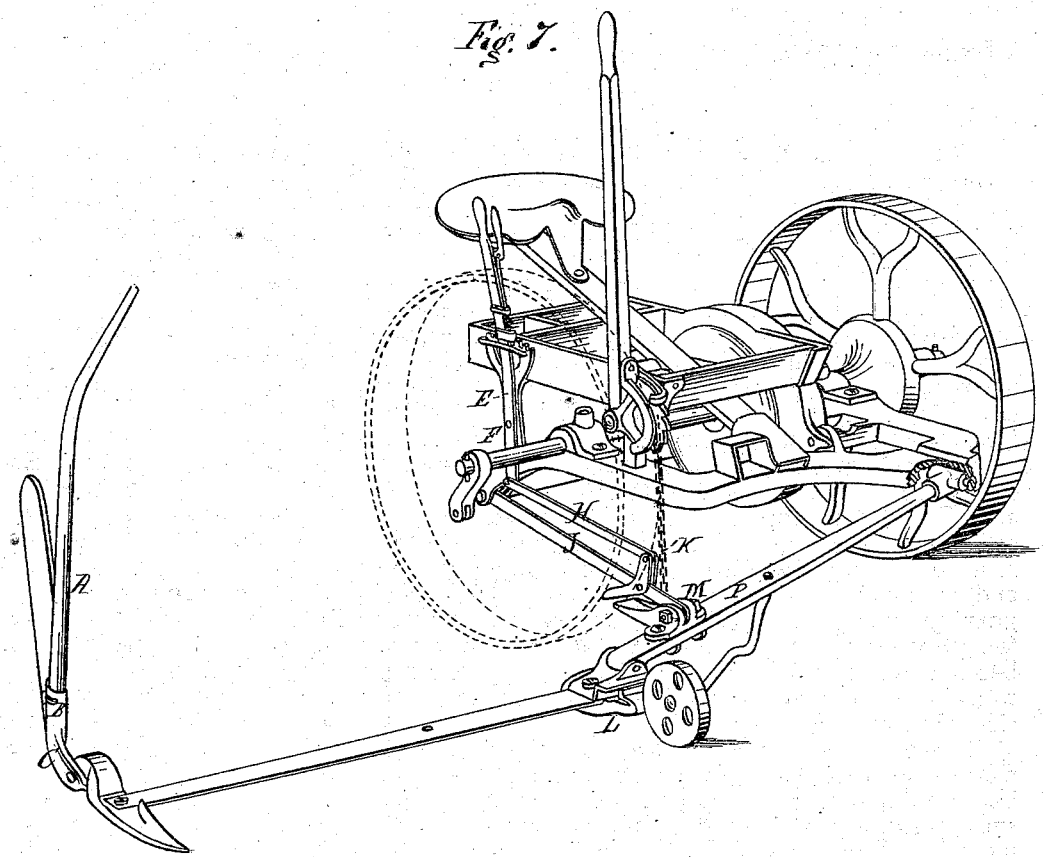

UNITED STATES PATENT OFFICE.

FRANK BRAMER, OF LITTLE FALLS, NEW YORK.

IMPROVEMENT IN MOWING-MACHINES.

Specification forming part of Letters Patent No. 156,760, dated November 10, 1874; application filed September 25, 1871.

*To all whom it may concern:*

Be it known that I, FRANK BRAMER, of Little Falls, New York, have invented certain Improvements in Harvesting-Machines, of which the following is a specification:

My invention consists of an improvement in the track-clearer of harvesting-machines, by which the dividing stick or finger may be turned in the iron shoe in which it is fastened, and the end of the stick or finger raised or lowered at will, that it may be adapted to the different kinds of grass or grain to be cut.

In lodged grass or grain the point is turned down, allowing the tangled mass to slip over and off the stick, leaving it evenly scattered over the ground, and not drawing it together in heaps, as is done where the stick is high and immovable. When cutting tall standing grass or grain the point is turned up, keeping the grass erect, and not allowing that cut to become tangled with that standing, making a track-clearer easily adjusted, and more efficient than any before devised.

The second part of my invention consists of a simple device by which the guard or finger-bar is tilted or turned up and maintained in such position that, in passing stones, hummocks, or other obstructions, the under side of the guards strike the obstacle and slide up and over it without the attention of the operator, and at the same time leaving it free to move in any direction possible under other circumstances, making a valuable improvement in harvesters for use upon uneven and rough land.

Figure 1 is a side elevation of the track-clearer. Fig. 2 is a plan of the track-clearer. Fig. 3 is a perspective view of the different parts of the same. Fig. 4 is a side elevation of the tilting apparatus, showing the general plan. Fig. 5 is an enlarged view of parts of the same. Fig. 6 is a perspective view of same. Fig. 7 is a perspective view of a mowing-machine, showing my improvements applied.

A is the dividing stick or finger, which, in combination with the board D, makes the track-clearer, and throws the grass cut away from that standing. The board D is bolted to the iron C, which is attached to the outer shoe of the finger-bar. The finger A is inserted in a socket in iron C, and secured in position by bolt O, which, by moving in the slot in C, allows the finger to be adjusted, at will, at any point between A and A', as shown in Figs. 1, 2, and 3. P, Figs. 6 and 7, is the main brace or connecting-bar between the frame of the machine and cutting device, so connected to the main frame that it is free to roll in its length. L is the inner or main shoe; M, a block firmly secured to connecting-bar P, and to which push-bar J is pivoted, of such form that the rear projects sufficiently so that eccentric K may push the end downward and elevate the points of the guards or fingers, as shown in Figs. 4 and 5, at L'. The upper end of the eccentric K is connected with the short arm of lever E by connecting-rod H, and lever E is secured in position by a rack attached to the frame of the machine.

I claim as my invention—

1. The divider-iron C, provided with the slotted socket for the reception of the dividing-finger A, and for permitting said finger to be rolled and secured in any desired position, substantially as and for the purpose hereinbefore set forth.

2. The eccentric K, in combination with the pivot-block M, for tilting or rocking the finger-bar on its longitudinal axis, substantially as and for the purpose hereinbefore set forth.

3. The combination of the eccentric K, block M, push-bar J, main brace P, connecting-rod H, and lever E, substantially as and for the purpose hereinbefore set forth.

FRANK BRAMER.

Witnesses:
WM. M. DORR,
SIDNEY A. LOOMIS.